K. F. LEES.
GREASE CUP.
APPLICATION FILED APR. 3, 1916.
1,207,302.
Patented Dec. 5, 1916.
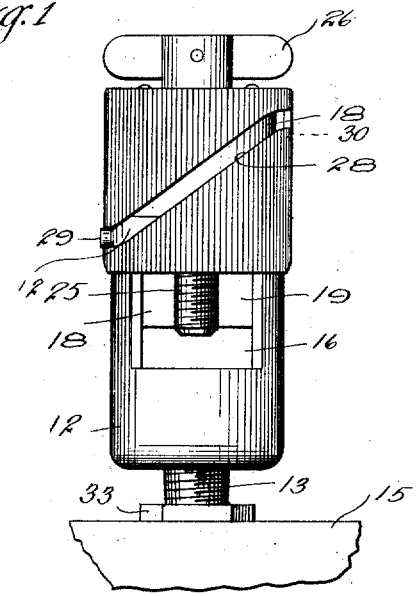
Fig. 1
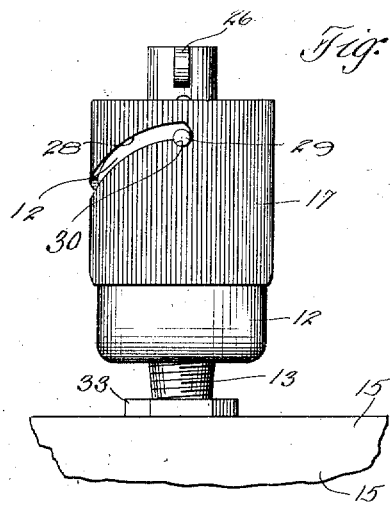
Fig. 2
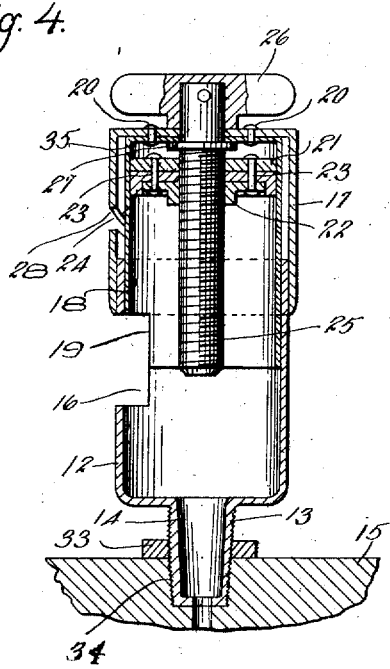
Fig. 4
Fig. 3
Fig. 5
Inventor
K. F. Lees
By Calvin Calver
Attorneys

UNITED STATES PATENT OFFICE.

KENNETH F. LEES, OF NEW HAVEN, CONNECTICUT.

GREASE-CUP.

1,207,302. Specification of Letters Patent. Patented Dec. 5, 1916.

Application filed April 3, 1916. Serial No. 88,499.

*To all whom it may concern:*

Be it known that I, KENNETH F. LEES, a citizen of the United States, residing at New Haven, in the county of New Haven and State of Connecticut, have invented or discovered certain new and useful Improvements in Grease-Cups, of which the following is a specification, reference being had therein to the accompanying drawings.

This invention relates to grease cups for use in connection with machinery bearings for the purpose of supplying lubricant thereto, particularly lubricant in the form of heavy or semi-solid grease, and has for its general object the provision of an improved grease cup of a type capable of being filled from the side without the complete removal of the cap or other component part of the cup, thereby providing for increased convenience in filling and obviating the danger of loss or misplacement of the part or parts removed.

Another object of the invention is the provision of a grease cup in which the lubricant will be securely retained against all possibility of leakage, in which all filling openings are covered at the exterior of the cup when the latter is closed, and in which the construction is such that the greater the internal pressure the tighter will be all joints through which said lubricant might tend to escape.

A further object of the invention is the provision of a grease cup having no screw threads capable of becoming damaged by use, said cup, moreover, being provided with positive means for locking the same in closed condition, and said locking means being of such a character that the greater the internal pressure the more securely will the locking be accomplished.

A still further and very important object of the invention is the provision of a grease cup whose normal capacity is increased when the cup is open, so that by opening and filling the cup, and thereafter closing the same, a portion of the lubricant will, in the act of closing, be automatically forced into the bearing, thereby filling the inlets and other parts of the bearing, while leaving the grease cup proper filled and ready to supply additional lubricant, as required, in the usual manner.

The foregoing and other objects of the invention, together with means whereby the same may be carried into effect, will best be understood from the following description of one form or embodiment thereof illustrated in the accompanying drawing. It will be understood, however, that the particular construction described and shown has been chosen for illustrative purposes merely, and that the invention, as defined by the claims hereunto appended, may be otherwise practised without departing from the spirit and scope thereof.

In said drawings: Figure 1 is a front elevation of the grease cup showing the same open for filling. Fig. 2 is a side elevation, looking from the left in Fig. 1, and showing the cup closed and locked. Fig. 3 is a central vertical section showing the cup in closed position. Fig. 4 is a similar view showing the cup open. Fig. 5 is a transverse or horizontal section taken substantially on the line 5—5, Fig. 3.

The grease cup herein shown comprises a cylindrical body member 12 having an open outer end and a closed inner end provided with a nipple 13, said nipple having a central bore 14 constituting a discharge opening. The nipple 13 is provided with exterior screw threads to engage, in the usual manner, the interior threads of a suitable opening 34 in the bearing 15 and with which opening said bore 14 communicates. The body member 12 is provided with a lateral filling opening 16 which, when the cup is closed, is covered by the cylindrical portion of a cap 17, which cap also closes the open outer end of said body member. Within said body member, and closely fitting the interior thereof, is a sleeve 18 having a lateral opening or notch 19, which, when the cup is opened, is adapted to register with the filling opening 16 in the body 12, said sleeve, as herein shown, having an end or head 35 rigidly connected with the cap 17, as by rivets 20. Slidably mounted within the sleeve 18 is a plunger or piston which, as herein shown, comprises a pair of metallic washers 21 and 22, permanently secured together by rivets 23, and clamping between them a leather or other flexible washer 24 forming a tight joint with the sleeve 18. The plunger is moved longitudinally of the cup, to force the grease therefrom through the discharge opening 14, by means of a stem or spindle 25 in threaded engagement with the plunger washer 22 and journaled in a central opening in the end of the cap 17 and sleeve 18. The spindle 25 is operable from the exterior of the cup by means of a suitable handle or key 26 having a hub pinned or otherwise secured to the outer end of said spindle, and is held against longitudinal movement with respect to the cap 17 and sleeve 18 by engagement of the hub of said handle with the exterior of said cap and engagement of an annular flange 27 on said spindle with the interior of the head 35 of the sleeve 18.

The cap 17 engages the exterior of the body 12 with a close sliding fit, while the sleeve 18 engages the interior of said body with a similar fit. Said cap and sleeve, which, as above described, are connected by the rivets 20 for movement in unison, are adapted for both rotary and axial movement upon said body. The cap 17 is formed with a preferably inclined or helical slot 28 which receives a stud 29 projecting from the exterior of the body 12, whereby, as said cap is rotated upon said body, it, together with the connected sleeve 18, is simultaneously moved longitudinally or axially thereof. The form and length of the slot 28 are preferably such as to provide for an angular movement of approximately 180° and an axial or longitudinal movement at least equal to the length of the filling opening 16 longitudinally of the body. Engagement of the stud 29 with the inner or lower end of the slot 28 prevents complete separation of the cap 17 when the cup is open. At the inner side of the slot 28 adjacent its outer or upper end is a notch 30 adapted to receive the stud 29 when the cup is closed and thereby lock said cup in closed position by resisting turning of the cap on the body. The position of the slot 28 is such as always to lie at one side of the filling opening 16, so that in no position of the cap 17 does said slot intersect or pass over said opening.

The sleeve 18 is preferably formed of relatively thin stock and is so connected with the cap 17 that, when said cap is turned into the open position shown in Figs. 1 and 4, the opening 19 therein is brought into register with the filling opening 16 in the body 12. When the cap 17 is turned into the closed position, as shown in Figs. 2 and 3, the sleeve 18 is moved to carry the opening 19 circumferentially to a position diametrically opposite the opening 16 and axially to a position out of alinement with said opening 16 transversely of the cup.

The sleeve 18 and plunger are connected by suitable means permitting relative longitudinal movement while holding said plunger against rotation with respect to said sleeve, thereby permitting operation of said plunger by the spindle 25 as above explained. As herein shown said means comprises a longitudinal slot 31 in said sleeve 18 which receives a lug 32 on the plunger washer 21, said slot also performing another function as hereinafter explained.

In order that the cup may be held in an angular position in which the filling opening 16 is most conveniently accessible, as also to prevent said cup from jarring loose from the bearing, there is provided on the threaded nipple 13 a lock nut 33 engaging the surface of the bearing 15.

To open the cup for filling, the spindle 25 is operated by the handle 26 to carry the plunger to its outermost position, and the cap 17 is turned into the position shown in Figs. 1 and 4, thereby causing said cap to uncover the filling opening 16, and bringing the opening 19 in the sleeve 18 into register therewith. Lubricant is thereupon introduced through the opening 16 until the cup is completely filled, whereupon the cap 17 is turned into closing position, as shown in Figs. 2 and 3, thus causing the opening 19 in the sleeve 18 to be moved both axially and circumferentially out of alinement with the opening 16, and causing said cap to cover said filling opening. Thereafter, if necessary, the cap 17 is given a slight outward pull to cause the stud 29 to enter the notch 30, thereby locking the cup in closed position. Under ordinary circumstances, however, it is found that the pressure exerted by the grease on the interior of the cup when the latter is closed is sufficient to cause said stud to enter said notch, and in this connection it is to be observed that the greater the internal pressure upon the cup the tighter will the stud 29 be held in the notch 30, and the more securely will the cup be locked in closed position.

By comparison of Figs. 3 and 4 it will be observed that the interior capacity of the cup when opened is considerably in excess of its capacity when closed. If, therefore, the cup, when in opened condition, be completely filled with lubricant, and thereafter closed, it will be seen that the act of closing the cup will operate to force the excess lubricant into the inlet passages and other parts of the bearing, thereby completely filling said parts, while leaving the closed cup filled with lubricant which may subsequently be forced into said bearing by operation of the plunger. In devices of this character considerable pressure is frequently required in order to force the lubricant into the bearing, particularly when the latter is badly clogged up, and, in grease cups as heretofore constructed, considerable difficulty has been encountered in preventing the escape of lubricant through the joints of the cup when subjected to this pressure. In the present cup, however, by reason of the combined circumferential and axial movement of the opening 19 out of register with the filling opening 16 when the cup is closed, as above explained, as also by reason of the fact that the filling opening 16 is at this time covered by the cap 17, it will be seen that a multiple seal is provided against the escape or leakage of the lubricant from the cup. In order to escape it would be necessary for said lubricant to pass both circumferentially and longitudinally of the cup from the opening 19 to the opening 16, and thence longitudinally to the edge of the cap 17. If the parts be properly fitted it is found that this provision is amply sufficient to prevent escape of lubricant even when the same is placed under pressure by the action of the plunger or by the closing of the cup, as above explained. It will, however, be observed that, by reason of the slot 31 in the sleeve 18, as also by reason of the thin and rather flexible stock of which said sleeve is composed, this sleeve is rendered expansible, so that under internal pressure it is forced into closer engagement with the interior of the relatively rigid and unyielding body 12, thereby further resisting the escape of lubricant, this resistance being increased in proportion to the increase in the internal pressure tending to cause such escape. The filling opening 19, which, as shown, is in the form of a notch at the inner or lower edge of the sleeve 18, further contributes to the expansibility of said sleeve, particularly at said inner or lower edge or end, at which point a tight joint with the body 12 is most essential. For most purposes this is found sufficient to prevent leakage of grease, so that, if desired, the slot 31 may be omitted and replaced by a rib engaging a suitably disposed notch in the plunger, or any other well known means for preventing relative rotation of the sleeve and plunger while permitting relative longitudinal movement thereof may be substituted for the slot 31 and lug 32.

It will be seen that, when the cup is closed, there are no uncovered openings adapted to collect foreign matter which might find its way into the interior of the cup when the latter is again opened. The only exposed opening at the exterior of the cup when the latter is closed is the slot 28 which, however, never passes over the filling opening, and which is cleaned at each operation by the stud 29.

It will also be seen that the device has no screw threads which are likely to become damaged or worn and thereby interfere with the proper operation. The only screw threads employed in the device are those on the nipple 13 which, however, under normal conditions, is never removed after having once been screwed into place, and those on the spindle 25 which is always protected and lubricated. It will furthermore be seen that the parts are all permanently connected, it being unnecessary and impossible completely to remove any of them under normal conditions of use, so that all danger of loss of loose parts, and all difficulty of replacement of such parts when removed, are entirely obviated.

Having thus fully described my invention what I claim as new and desire to secure by Letters Patent is:—

1. A grease cup comprising a body having a lateral filling opening, a sleeve within said body and movable to cover and uncover said opening, and a cap fitted to the end of said body and having a depending portion inclosing the exterior of said body, said cap being longitudinally movable on said body to cause said depending portion to cover and uncover said filling opening.

2. A grease cup comprising a cylindrical body having an open outer end and a lateral filling opening, a cap closing the outer end of said body, movably mounted thereon, and having an inclined slot, a stud projecting from said body and engaging said slot to guide said cap in a combined axial and rotary movement on said body to cover and uncover said filling opening, and a sleeve within said body and operatively connected with said cap, said sleeve having an opening movable into and out of register with said filling opening.

3. A grease cup comprising a cylindrical body having an open outer end and a lateral filling opening, a cap mounted on the exterior of said body, closing the outer end thereof, and movably mounted thereon, said cap having an inclined slot cut therethrough, and a stud projecting from said body and engaging said slot to guide said cap in a combined axial and rotary movement on said body to cover and uncover said filling opening, said slot being so located in said cap as always to lie at one side of said filling opening in all positions of said cap.

4. A grease cup comprising a body having an open outer end and a lateral filling opening, a cap closing the outer end of said body and movable thereon in one direction to cover and in the opposite direction to uncover said opening, and means for locking said cap against movement in the direction to uncover said opening, said means being rendered operative by incipient movement of said cap in said last named direction.

5. A grease cup comprising a body having an open outer end and a lateral filling opening, a cap closing the outer end of said body and movable thereon to cover and uncover said opening, said cap having a slot, and a stud projecting from said body and engaging said slot to guide said cap in its movements, there being a notch at the lateral edge of said slot adjacent one end thereof to receive said stud and lock said cap in position to cover said opening.

6. A grease cup comprising a body having a lateral filling opening, a cap movable on said body to cover and uncover said opening, and a sleeve within said body and operatively connected with said cap, said sleeve having an opening movable into and out of register with said first named opening.

7. A grease cup comprising a cylindrical body having an open outer end and a lateral filling opening, a cap closing the outer end of said body and mounted thereon for both rotary and axial movement to cover and uncover said opening, and a sleeve within said body and operatively connected with said cap, said sleeve having an opening movable into and out of register with said first-named opening.

8. A grease cup comprising a body having a lateral filling opening, and means for closing said opening and for simultaneously diminishing the capacity of said cup.

9. A grease cup comprising a body having an open outer end and a lateral filling opening, and a cap closing the outer end of said body and axially movable thereon to cover and uncover said opening and to diminish the capacity of said cup simultaneously with the covering of said opening.

10. A grease cup comprising a body having an open outer end, a lateral filling opening, and a discharge opening; a cap closing the outer end of said body and axially movable thereon to cover said opening and thereby simultaneously close said cup and diminish the capacity thereof; and a plunger within said cup for forcing lubricant therefrom through said discharge opening when said cup is closed.

11. A grease cup comprising a body having a lateral opening, a cap movable on said body to cover and uncover said opening, and a sleeve within said body having an opening, said sleeve being movable to bring the opening therein into and out of register with the opening in said body.

12. A grease cup comprising a cylindrical body having an open outer end and a lateral filling opening, a cap closing the outer end of said body and movably mounted thereon, means for guiding said cap in a combined rotary and axial movement on said body to cover and uncover said opening, and a sleeve within said body and rigidly connected with said cap so as to move therewith, said sleeve having an opening brought into and out of register with said filling opening both axially and circumferentially of said cup as said cap and sleeve are moved.

13. A grease cup comprising a body having a discharge opening, a longitudinally slotted sleeve within said body and substantially fitting the interior thereof, a plunger within said sleeve and having a lug engaging the slot therein, a spindle having threaded engagement with said plunger and operable from the exterior of said cup, and means for holding said spindle against longitudinal movement.

14. A grease cup comprising a body having a lateral filling opening and a discharge opening, a sleeve within said body composed of relatively thin stock and having a notch at its end, whereby said end is rendered expansible, said sleeve being movable to bring said notch into and out of register with said filling opening, and means for applying pressure to the lubricant in said cup to force the same through said discharge opening.

In testimony whereof I affix my signature.

KENNETH F. LEES.